United States Patent [19]

Detwiler

[11] Patent Number: 4,909,873
[45] Date of Patent: Mar. 20, 1990

[54] METHOD OF SPLICING ADJACENT ENDS OF PRECURED TREAD MATERIAL WHEN RETREADING TIRES THEREWITH

[76] Inventor: Richard H. Detwiler, 15 Easter Ave., Windham, Me. 04082

[21] Appl. No.: 251,821

[22] Filed: Oct. 3, 1988

[51] Int. Cl.$^4$ .............................................. B29D 30/54
[52] U.S. Cl. ......................................... 156/96; 264/36
[58] Field of Search ............. 156/96, 95, 157, 244–22, 156/304.1, 64, 378, 379; 264/36, DIG. 74

[56] References Cited

U.S. PATENT DOCUMENTS

| | | | |
|---|---|---|---|
| 2,976,910 | 3/1961 | Nowak | 156/96 |
| 3,149,658 | 9/1964 | Wolfe | 264/36 |
| 3,236,709 | 2/1966 | Carver | 156/96 |
| 3,282,759 | 11/1966 | Nemeth | 156/157 |
| 3,983,193 | 9/1976 | Wulker et al. | 264/36 |
| 4,240,851 | 12/1980 | King | 156/96 |

FOREIGN PATENT DOCUMENTS 2502907  7/1975  Fed. Rep. of Germany ...... 156/157

Primary Examiner—Raymond Hoch

[57] ABSTRACT

A splice between ends of precured tread material is effected by establishing a gap between the ends that are to be spliced together after the tread material has been fitted to the buffed area of a tire with a cushion layer of uncured rubber between the material and the buffed area. The gap is established without compressing the tread material adjacent the gap and is approximately three-sixteenths of an inch and is filled with natural rubber using an extruder gun in a manner flushing air from the gap. The tire is then cured by heat and pressure for the necessary time required by the particular curing process employed.

6 Claims, 4 Drawing Sheets

METHOD OF SPLICING ADJACENT ENDS OF PRECURED TREAD MATERIAL WHEN RETREADING TIRES THEREWITH

BACKGROUND OF THE INVENTION

In the retreading of a buffed tire with precured tread material, the precured tread material is fitted on the tire with a cushion layer of uncured rubber between the buffed area of the tire and the tread material. The proximate ends of a length or lengths of the precured tread material have been, prior to the present invention buffed and coated with a rubber cement. Before the curing step, the two ends are temporarily spliced together by staples.

In practice, the ends of the tread material which are to be sliced together are so dimensioned relative to each other that one end will overlap the other with the overlap about a half an inch in length so that the overlap when forced against the cushion layer of uncured rubber is crammed against the other end not only compressing the uncured rubber strip but also compressing the adjacent end portions of the tread material in a manner such that they are stressed for several inches from the splice to an extent greater than any stress in other portions of the retread material. The butted ends are then held together by staples which are removed after the retreaded tire has been cured by heat and pressure.

It will be appreciated that since flat tread material is being fitted against a curved buffed area, the excess length of tread material to be absorbed lengthwise of the tread material is greater adjacent its side margins than in its central portions. While the practice is to ensure enough of an overlap to avoid gaps under production conditions gaps do occur and these are filled with lengths cut from an uncured rubber strip.

A disadvantage of splices affected in the above described manner is that the lengthwise compression of the tread material adjacent the splice results in the cushion layer being cured at a somewhat lowered pressure than the tread material remote from the splice since the curing pressure is reduced by the tendency of the tread material adjacent the splice to return to its normal length in which it would be humped slightly away from the tire.

THE PRESENT INVENTION

The general objectives of the present invention are to ensure a splice of maximum strength and to ensure that the uncured tread material is equaly stressed about the tire.

In accordance with the invention, these objectives are met by applying tread material to the buffed casing with the ends to be spliced together buffed and preferably coated with a rubber cement and spaced about three-sixteenths of an inch apart, at least after the tire has been stitched. Uncured rubeer in a form to be extruded is then injected into the gap using the extruder gun in a manner ensuring that air in the gap is flushed therefrom ahead of the filling of the gap by the incoming rubber.

The major gains from using splices in accordance with the invention are two fold. In the first place, the splice does not result in unwanted lengthwise stresses. The other major gain is that the filling of the gaps with soft uncured rubber enables higher adhesion values to be attained since the chance of air inclusion is minimized.

The stated dimensions of the gap are determined by the fact that the gap should be as narrow as possible since the uncured rubber between the two spliced-together ends does not constitute satisfactory tread material and by the fact that the effectiveness of the injected uncured rubber is flushing out air ahead of the incoming extruded uncured rubber requires that the gap be accommodative of the tip of the nozzle of the extruder gun.

BRIEF DESCRIPTION OF THE DRAWINGS

The accompanying drawings illustrate a preferred embodiment of the invention

THE PREFERRED EMBODIMENT OF THE INVENTION

Figure 1:
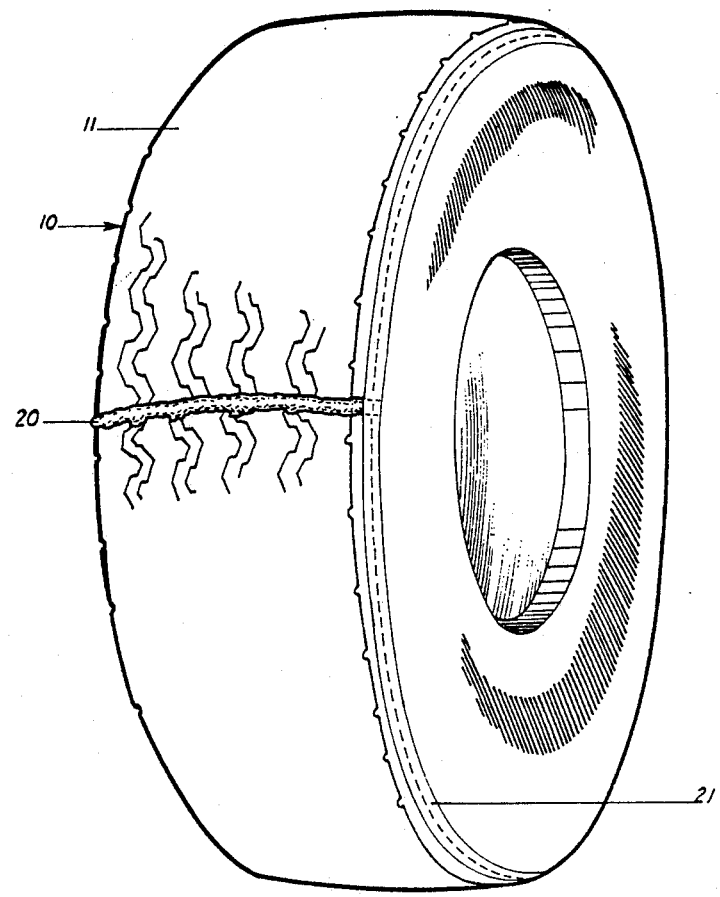
FIG. 1 is a view, in perspective of a tire which has been retreaded in accordance with the invention.

The retreaded tire generally indicated at 10 in FIG. 1 was conventionally prepared for the application of precured tread material 11 by buffing the casing 12 to the desired radius and width and by making any necessary repairs thereto. A cushion layer 13 applied either to the back or undersurface of the tread material 11 or to the buffed crown of the casing 12, bonds the tread material 11 thereto as a result of the tire having been stitched and then exposed to heat and pressure for the appropriate interval as required by whichever curing procedure was followed.

Figure 2:
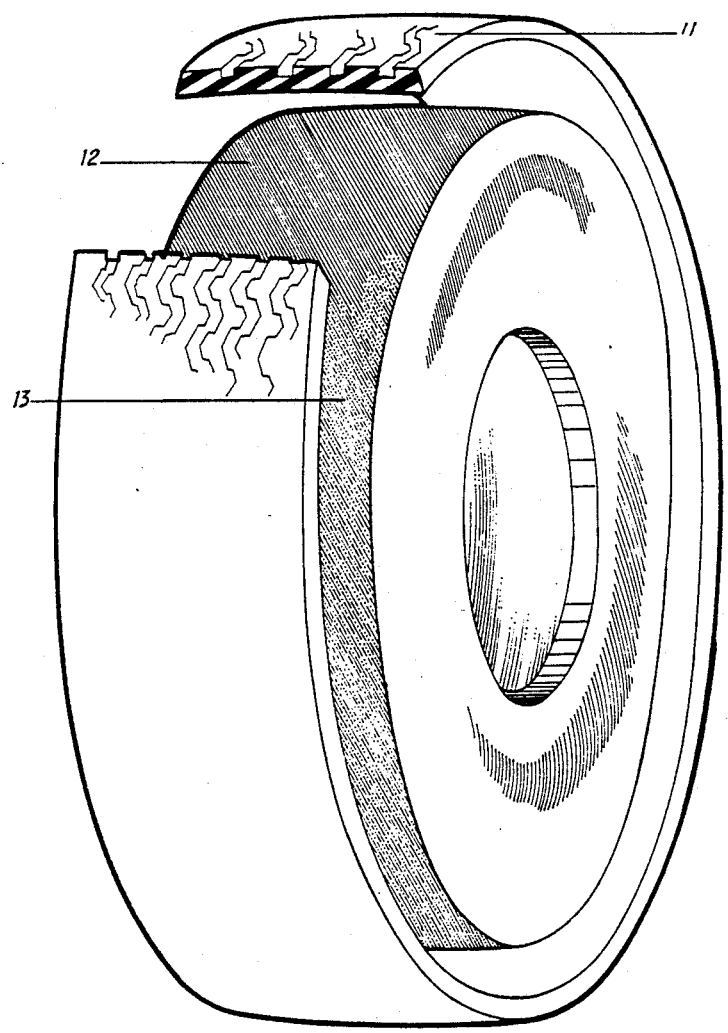
FIG. 2 is a like view of a tire before the tread material is fitted thereon.
Figure 3:
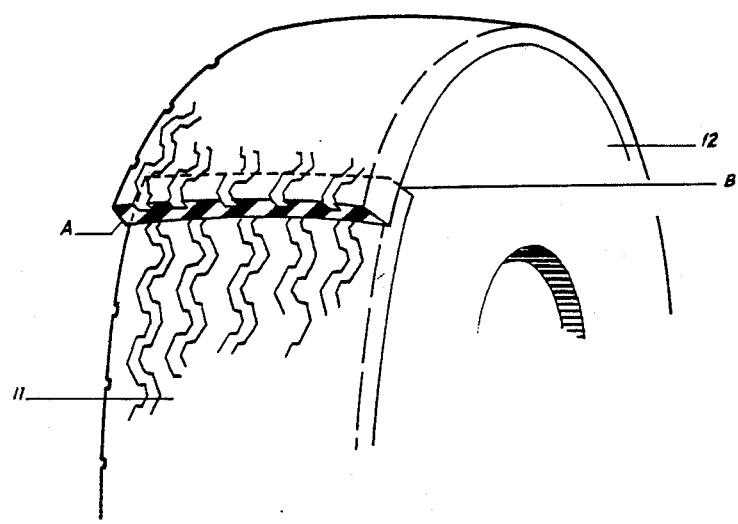
FIG. 3 is a fragmentary perspective view of the tire with the tread material fitted to the tire with one end overlapping the other.
Figure 4:
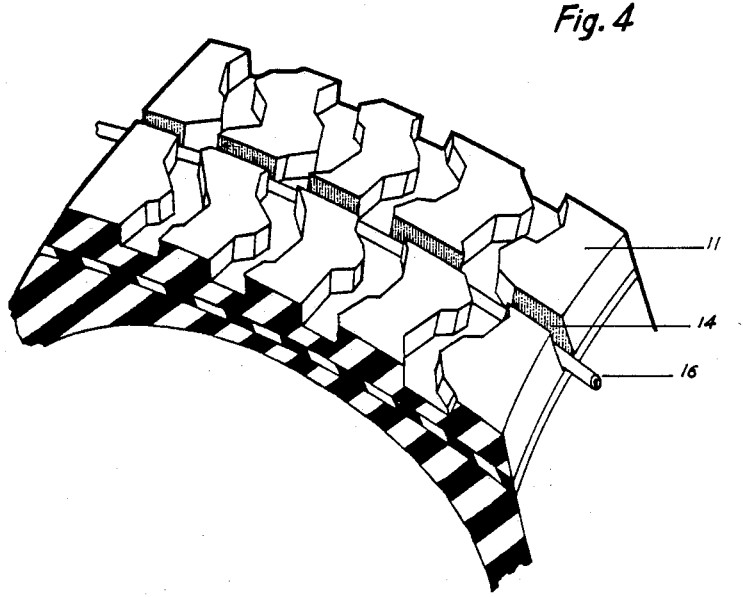
FIG. 4 is a fragmentary, perspective view of the tire with the established gap blocked against being narrowed while the tire is being stitched.

It is assumed in FIG. 2 that the precured tread material consists of a single length which was originally of such a length that, when fitted against the cushion layer 13, one end overlaps the other as shown in FIG. 3. From either theoretical meeting point A or B in FIG. 3, the appropriate one of the end portions is cut back to provide a gap 14 of about three-sixteenths of an inch in width between the ends of the tread material after the ends have been buffed, preferably coated with rubber cement 15, see FIGS. 4 and 5 and pushed back against the cushion layer 13. The gap 14 is typically about one-sixteenths of an inch wider at the center of the tread material than it is at the side margins thereof. In order that the gap 14 will not be appreciably narrower by the stitching of the tire, it is preferred that a plastic tube 16 be fitted in the gap 14. In practice, the gap is the covered by a tape (not shown) to ensure that it is kept clean. After the stitching operation, the tape is pulled from the tread and the tube 16 is removed from the gap.

Figure 5:
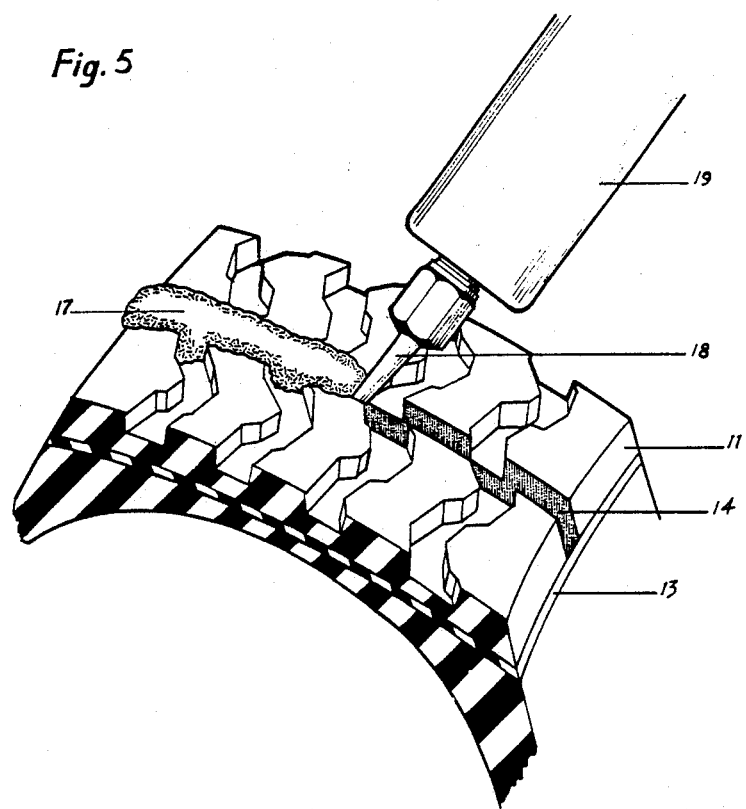
FIG. 5 is a somewhat schematic view illustrating the gap of the splice being filled and with air being flushed therefrom by the incoming extruded, uncured rubber.

As illustrated by FIG. 5, soft uncured rubber 17 is injected into the gap 14 with the tip 18 of the nozzle of an extruder gun 19 entered in one end of the gap 14 and advanced to the other end of the gap 14 in a manner not only filling the gap but also flushing the air therefrom in advance of the nozzle tip 18. It is preferred that the gap 14 be overfilled to leave protruding rubber which can be readily shaved therefrom after the curing stage has been completed to finish the splice, generally indicated at 20 in FIG. 1.

The tire 10 is shown as of a type retreaded in accordance with my copending application, Ser. No. 161,031, filed Feb. 24, 1988, entitled "Tire Provided With a Precured Tread and Method of Making the Same". Such a tire features blending strips 21 of uncured rubber which extend around both sides of the tire, cover the edges of the cushion layer 13 and merge with the adjacent margins of the precured tread 11 and the casing of the tire. In accordance with the present invention, it is preferred that the blending strips or layers 21 be applied after the gap 14 has been filled with soft, uncured rubber to ensure that no air can be entrapped thereby at the ends of the gap.

Figure 6:
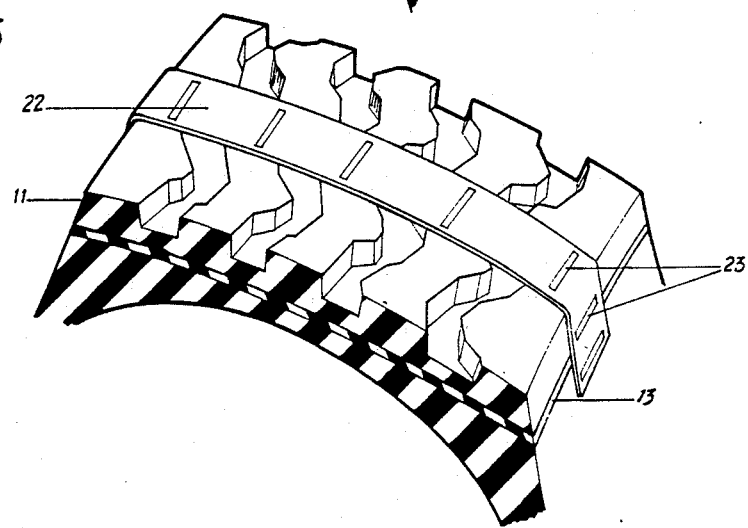
FIG. 6 is a like view of a tire to be cured within an envelope with the filled gap covered by an anchored plastic strip.

The tire 10 may be cured by any appropriate curing procedure while the uncured rubber filling the gap or gaps 14 thereof may be protected from the curing medium by a butyl or silicone coating, such are not normally required, particularly if the gap or gaps 14 are overfilled. Staples are not normally required but may be employed if tire growth faster than tread growth should be experienced. If such curing system employs an envelope, the gap is not overfilled and the envelope must be prevented from being forced into any gap 14. Protection may be effected by covering each filled gap 14, see FIG. 6, with a flexible plastic strip 22 temporarily anchored by staples 23.

It will be appreciated that if a length of precured tread material is such that one or both ends establish the appropriately dimensioned gap by itself or with an adjacent length or lengths or precured tread material when fitted to the buffed area of a tire, as may be the case when the precured tread is in sections, it is only necessary to buff and preferably coat with rubber cement, the gap establishing ends. If the precured tread material required to cover the buffed area consists of two or more separate lengths, any overlap between their ends when fitted on a tire are treated as described earlier in connection with FIG. 3.

The buffing of ends which are to be butted one against the other or are to be joined by a strip of uncured rubber is a necessary and conventional practice as is the coating of such ends with rubber cement. Like buffing and cementing of tread material ends is required where such ends are to be connected by uncured rubber in a plastic state. In the practice of the present invention, the buffing and cementing of ends bordering a gap are steps usually carried out when a length or lengths must be trimmed after being fitted on the buffed area of a tire. In some instances, a length suitable for use with one or more other lengths in covering a buffered tire may have had one or both ends buffered and cemented before use.

I claim:

1. The method of retreading a tire with precured tread material after an expose casing surface of the tire has been buffed and, if necessary, repaired, said method consisting of the steps of covering the buffed area by fitting a length or lengths of precured tread material on the buffed area of the tire with a cushion layer of uncured rubber between the tread material and the buffed area with a transverse gap between the ends of the length or adjacent ends of lengths of the tread material, the gap or gaps approximately three-sixteenths of an inch in width at the sides of the tire without lengthwise compression of the tread material adjacent said ends, stitching the tire, splicing said ends by injecting uncured rubber in a plastic state both to fill the gap or gaps and to flush air therefrom and then curing the cushion layer of uncured rubber and the uncured rubber in the gap or gaps by subjecting the tire to a caring medium under a predetermined pressure and at a predetermined temperature for a predetermined length of time.

2. The method of claim 1 in which the precured tread material is of a length such that, when fitted on the buffed area, one end overlaps the other, and the additional step of trimming the length relative to a theoretical, transverse meeting line to the extent necessary to establish said gap.

3. The method of claim 1 in which the precured tread material consists of a plurality of lengths which enable the material to be fitted on the buffed area with a gap of three-sixteenths of an inch in width between adjacent ends of two lengths, one end of one length overlapping the end of another length and the additional step of trimming at least one such end relative to a theoretical transverse meeting line to the extent necessary to establish a gap of approximately three-sixteenths of an inch in width.

4. The method of claim 1 and the step preceding the stitching of the tire, of temporarily filling the gap with a plastic tube and anchoring the tube therein.

5. The method of claim 1 in which in the splicing step, the uncured rubber is applied in a manner overfilling the gap and the additional step after the curing step of shaving off the excess and now cured rubber protruding from the gap.

6. The method of claim 1 in which the curing step requires that the tire be within an envelope and the additional step of covering the filled gap with a tape and then temporarily anchoring the tape with staples.

* * * * *